(12) United States Patent
Bronnum et al.

(10) Patent No.: US 6,538,043 B1
(45) Date of Patent: Mar. 25, 2003

(54) CO-INITIATED POLYETHER POLYOL AND PROCESS FOR ITS PREPARATION

(75) Inventors: Thomas Bronnum, Louvain-la-Neuve (BE); Melis Hasselaar, Vondelingenplaat-Rotterdam (NL); Parminder Singh Sangha, Amsterdam (NL); Francoise Van Tiggelen, Louvain-la-Neuve (BE)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/786,775
(22) PCT Filed: Sep. 8, 1999
(86) PCT No.: PCT/EP99/06658
§ 371 (c)(1), (2), (4) Date: Mar. 8, 2001
(87) PCT Pub. No.: WO00/15689
PCT Pub. Date: Mar. 23, 2000

(30) Foreign Application Priority Data

Sep. 10, 1998 (EP) .............................................. 98203026

(51) Int. Cl.$^7$ ............................................. C08G 18/28
(52) U.S. Cl. ............. 521/174; 252/182.24; 252/182.27; 521/170
(58) Field of Search ....................... 252/182.24, 182.27; 521/170, 174

(56) References Cited

U.S. PATENT DOCUMENTS

| | | | |
|---|---|---|---|
| 3,833,526 A | 9/1974 | Cear et al. | |
| 5,254,745 A | 10/1993 | Jähme | ........................ 568/613 |

FOREIGN PATENT DOCUMENTS

| | | |
|---|---|---|
| EP | 0454446 A1 | 4/1991 |
| EP | 0671425 A1 | 3/1995 |
| EP | 0778302 A1 | 12/1996 |
| GB | 1177636 | 2/1967 |

*Primary Examiner*—John M. Cooney, Jr.

(57) ABSTRACT

A process for the preparation of a co-initiated polyether polyol, which process comprises the steps of: (a) preparing a mixture of at least one aromatic initiator, at least one polyethylene glycol and optionally one or more aliphatic initiators, (b) reacting the mixture obtained in step (a) in the presence of a suitable alkoxylation catalyst with at least one alkylene oxide having three or more carbon atoms per molecule using such quantity of alkylene oxide that the polyether polyol obtained has a hydroxyl value in the range of from 150 to 400 mg KOH/g, and (c) recovering the co-initiated polyether polyol. The co-initiated polyether polyol is [very] suitable for the preparation of rigid polyisocyanurate-modified polyurethane foams. Such foams have a good flame retardancy.

10 Claims, No Drawings

CO-INITIATED POLYETHER POLYOL AND PROCESS FOR ITS PREPARATION

The present invention relates to a co-initiated polyether polyol, to a process for the preparation of such polyether polyol, to polyol formulations containing such polyether polyol and to polyisocyanurate-modified polyurethane foams obtained from said polyether polyol.

Nowadays polyisocyanurate-modified rigid polyurethane foams (PIR/PUR foams) become more and more accepted in the building insulation market, anyhow in Europe. In this particular market PIR/PUR foams have to compete with the conventional rigid polyurethane foams (PUR foams). In terms of foam properties PIR/PUR foams are very similar to PUR foams. The formulation characteristics of both foams are, however, different. The main difference concerns the amount of isocyanate used to prepare the foam: this amount is higher for PIR/PUR foams. Accordingly, the isocyanate index for PIR/PUR foams is higher than that for PUR foams. The relatively large excess of isocyanate groups in PIR/PUP foaming formulations is reacted by adding trimerisation catalyst(s) to the reaction mixture. In this way the isocyanurate structures are formed. These isocyanurate structures improve the fire retardancy and thermal stability of the final foam and also induce an increased friability.

At present difunctional aromatic polyester polyols are commonly used in the manufacture of PIR/PUR foams. One category of such polyester polyols typically used are the polyester polyols produced from phthalic anhydride and diethylene glycol. Another category uses either the heavy residue of the production of dimethyl terephthalate or scraps of recycled polyethylene terephthalate (PET) as the feedstock.

The present invention aims to provide a dedicated polyether polyol, which can be used for producing PIR/PUR foams without using any polyester polyol. A further purpose of the present invention is to provide a method for producing such dedicated polyether polyol. Still a further object is to provide a PIR/PUK foam, of which the polyol component is entirely polyether polyol based and of which the end-properties are at least comparable to those of the conventional polyester polyol-based PIR/PUR foams.

The term "polyether polyol" as used in this connection refers to polyols comprising poly(alkylene oxide) chains, which polyols are normally obtained by reacting a polyhydroxy initiator compound with at least one alkylene oxide and optionally other compounds. The term "co-initiated polyether polyol" refers to a polyether polyol obtained by the alkoxylation of a blend of at least two different polyhydroxy compounds. The term "molecular weight" as used throughout this specification refers to number average molecular weight. The term "average molecular weight" refers to number average molecular weight per mole of initiator used.

The above objects have been realised by a specific co-initiated polyether polyol based on an aromatic initiator, polyethylene glycol, optionally an aliphatic, initiator and alksylene oxide.

Accordingly, in a first aspect the present invention relates to a process for the preparation of a co-initiated polyether polyol, which process comprises the steps of:

(a) preparing a mixture of:
- (a1) at least one aromatic initiator containing at least two active hydrogen atoms per molecule and
- (a2) at least one polyethylene glycol having a molecular weight in the range of from 400 to 1000 and
- (a3) optionally one or more aliphatic initiators containing from 2 to 6 active hydrogen atoms per molecule in an amount of at most 20 mole % based on total moles of (a1) and (a3), wherein the molar ratio of (a1) to (a2) is in the range of from 0.5:1 to 5:1, and (b) reacting the mixture obtained in step (a) in the presence of a suitable alkoxylation catalyst with at least one alkylene oxide having three or more carbon atoms per molecule using such quantity of alkylene oxide that the polyether polyol obtained has a hydroxyl value in the range of from 150 to 400 mg KOH/g, and (c) recovering the co-initiated polyether polyol.

The aromatic initiator used as component (a1) in step (a) may be any aromatic initiator known in the art to be suitable for acting as a starter molecule in the preparation of polyether polyols. Suitable aromatic initiators should contain at least two active hydrogen atoms per molecule available for reaction with alkylene oxide. Such active hydrogen atoms are typically present in the form of hydroxyl groups, but may also be present in the form of e.g. amine groups. Preferred initiators are those aromatic initiators containing from 2 to 5, more preferably 2 or 3 and most preferably 2 active hydrogen atoms in the form of hydroxyl groups per molecule. Concrete examples of suitable aromatic initiators include 2,2'-bis(4-hydroxylphenyl)propane (bisphenol A), 2,2'-bis(4-hydroxylphenyl)butane (bisphenol B) and 2,2'-bis(4-hydroxylphenyl)methane (bisphenol F). Similar compounds, wherein the hydroxyphenyl moiety contains one or more alkyl substituents, preferably methyl, may also be used. Bisphenol A is a preferred aromatic initiator.

The aromatic initiator component (a1) may consist of one sole aromatic initiator or of a blend of two or more different aromatic initiators provided such blend contains on average at least two active hydrogen atoms per initiator molecule. The aromatic initiator component (a1) may also be used in combination with an aliphatic initiator component (a3) consisting of one or more aliphatic initiators containing from 2 to 6 active hydrogen atoms per molecule. Such aliphatic initiator component, if present, is used in an amount of at most 20 mole % based on total moles of (a1) and (a3), preferably from 0.5 to 10 mole %. The average number of active hydrogen atoms per initiator molecule in such a combination should preferably be in the range of from 2 to 4, more preferably from 2 to 3 and most preferably equals 2. It will be understood that the nominal average functionality of the resulting polyether polyol will correspond with the number of active hydrogen atoms per initiator molecule. Examples of suitable aliphatic initiators are those known in the art including diethylene glycol, glycerol, pentaerythritol tri-methylolpropane, triethanolamine, mannitol and sorbitol. It has, however, been found particularly advantageous to use no aliphatic initiator component, inter alia because it adds to the cost of the formulation while having no recognisably beneficial effect on the end-properties of the PIR/PUR foam eventually obtained.

Suitable polyethylene glycols to be used as component (a2) are those polyethylene glycols having a molecular weight in the range of from 400 to 1000, preferably from 400 to 800, more preferably from 450 to 700. It will be understood that polyethylene glycols contain two hydroxyl groups, which are available to react with alkylene oxide. The polyethylene glycol component (a2) may consist of one or more, preferably one or two, polyethylene glycols. If more than one polyethylene glycol is used, they should all meet the above requirement as to molecular weight. Suitable polyethylene glycols are commercially available from several suppliers or can be prepared by methods known in the art.

In the process of the present invention it is essential that the aromatic initiator component (a1) and the polyethylene glycol component (a2) are admixed before alkylene oxide is allowed to react with the active hydrogen atoms present in both polyethylene glycol and initiator compound(s). The components (a1) and (a2) are mixed in a molar ratio of (a1) to (a2) in the range of from 0.5:1 to 5:1, preferably 1:1 to 4:1, more preferably 1:1 to 3:1. It is preferred that one aromatic initiator is mixed with one polyethylene glycol in step (a) in a molar ratio of aromatic initiator to polyethylene glycol of from 1:1 to 4:1. If any aliphatic initiator component (a3) is present this component should also he admixed with components (a1) and (a2) prior to the reaction with alkylene oxide. By first mixing the initiator(s) and polyethylene glycol(s) before reaction with alkylene oxide, it is ensured that a co-initiated polyether polyol is obtained containing both aromatic moieties (originating from the aromatic initiator) and ethylene oxide moieties (originating from the polyethylene glycol). It was found that such composition of the co-initiated polyether polyol is very beneficial for the fire retardant properties of the PIR/PUR foam eventually obtained therefrom.

After initiator(s) and polyethylene glycol(s) have been mixed in step (a) the resulting mixture is reacted with at least one alkylene oxide having three or more carbon atoms per molecule using such quantity of alkylene oxide that the polyether polyol obtained has a hydroxyl value in the range of from 150 to 400 mg KOH/g, preferably from 175 to 350 mg KOH/g and more preferably 200 to 300 mg KOH/g. Most preferably, the OH value is at most 300 mng KOH/g. Such OH values will normally be obtained when per mole of aromatic initiator component from 1.2 to 10 moles of alkylene oxide are used, sore particularly from 2 to 8 moles.

The alkylene oxide(s) used should contain at least three carbon atoms per molecule. Suitable alkylene oxides, then, include in particular propylene oxide and butylene oxide, although higher alkylene oxides may also be applied. Most advantageously, however, propylene oxide is used as the sole alkylene oxide.

Step (a) of the process according to the present invention is preferably carried out at such temperature and pressure that the resulting mixture is a homogeneous liquid. Suitably, the temperature applied may vary from 10 to 175° C., preferably from 25 to 150° C., more preferably from 75 to 140° C., and the pressure from 0.5 to 10 bara, although it is preferred to work at a pressure of 1 to 2 bara. The components are suitably mixed by dissolving the aromatic initiator component, optionally together with the aliphatic initiator component, in the polyethylene glycol component. Step (b) of the present process is carried out under conditions normally applied in the alkoxylation of polyhydroxyl compounds. Accordingly, temperatures applied are suitably in the range of from 50 to 150° C., preferably 80 to 140° C., and pressures applied from 0.5 to 10 bara ($10^5$ N/m$^2$) with atmospheric pressure being particularly preferred The alkoxylation is typically carried out in the presence of a suitable alkoxylation catalyst as is well known in the art. Both acid and basic catalysts can be used. Examples of acid catalysts include Lewis acids like boron trifluoride, stannic chloride or combinations of ferric chloride with thionyl chloride. Double metal cyanide catalysts, often comprising zinc hexacyano cobaltate as the active ingredient, may also be used. For the purpose of the present invention, however, it is preferred to use basic catalysts. The basic catalyst most commonly used is potassium hydroxide. The catalyst is suitably added to the reactor after when all initiator is present in the reactor, but before the alkylene oxide is added.

The amount of catalyst used is in the range normally applied, i.e. from 0.05 to 2 wt % based on final product. After the alkoxylation the catalyst is suitably removed by neutralization with a suitable neutralizing agent, such as acetic acid, phosphoric acid or disodium dihydrogen pyrophosphate.

The polyether polyol can be recovered by the measures conventionally applied. Such measures will typically include one or more of the following treatments: neutralization (to remove the catalyst), dewatering, steam stripping and drying and filtration.

In a further aspect the present invention relates to a co-initiated polyether polyol having an aromaticity in the range of from 5 to 35 wt % and an average molecular weight in the range of from 300 to 1000, which polyether polyol is obtainable by a process as described above.

In this specification the term "aromaticity" refers to the weight percentage of aromatic carbon atoms, i.e. carbon atoms contained in an aromatic ring structure, present in the co-initiated polyether polyol relative to the total weight of the co-initiated polyether polyol. The co-initiated polyether polyol according to the present invention has an arormaticity in the range of from 5 to 35 wt %, preferably 10 to 30 wt %, more preferably 15 to 25 wt %.

The co-initiated polyether polyol according to the present invention furthermore has an average molecular weight in the range of from 300 to 1000, with an average molecular weight of from 350 to 800, more in particular 400 to 600, being preferred. The nominal average functionality of the polyether polyol will normally be in the range of from 2 to 6. However, it has been found particularly advantageous that the co-initiated polyether polyol has a nominal average functionality in the range of from 2 to 4, more preferably 2 to 3 and most preferably of 2.

The hydroxyl value of the co-initiated polyether polyol is in the range of from 150 to 400 mg KOH/g, preferably from 175 to 350 mg KOH/g and more preferably 200 to 300 mg KOH/g. Most preferably, the OH value is at most 280 mg KOH/g. The ethylene oxide content of the polyether polyol depends on the amount and molecular weight of the polyethylene glycol(s) used in its preparation. Suitably, the ethylene oxide content will be in the range of from 20 to 60 wt %, with 30 to 50 wt % being preferred.

In a still further aspect the present invention relates to a polyether polyol formulation comprising a co-initiated polyether polyol as defined above in admixture with a rigid, aromatic polyether polyol having a hydroxyl value of at least 400 mg KOH/g, preferably of from 500 to 600, and an average nominal functionality of at least 2.3, preferably of from 3 to 4.5.

The rigid, aromatic polyether polyol may be any such polyol known in the art which meets the above requirements as to hydroxyl value and average nominal functionality. These polyols are well known and commercially available from several suppliers.

The present invention also relates to a process for the preparation of a rigid polyisocyanurate-containing polyurethane foam (PIR/PUR foam), which process comprises foaming a formulation comprising (a) a co-initiated polyether polyol or a polyether polyol formulation a2 described herein before,
(b) a polyisocyanate in such amount that the isocyanate index is at least 150, preferably from 180 to 600,
(c) polyurethane catalyst and/or polyisocyanurate catalyst,
(d) one or more blowing agents, and
(e) usual auxiliaries.

The polyisocyanate, used as component (b), may be any polyisocyanate known to be suitable in rigid polyurethane foams. Suitably, aromatic polyisocyanates are used and any di-, tri-, tetra- and higher functional aromatic polyisocyanate may be used. In EP-A-0,778,302, for instance, a list with suitable polyisocyanates is given. Preferred polyisocyanates are 2,4- and 2,6-toluene diisocyanate as well as mixtures thereof; 4,4'-diphenyl-methane diisocyanate (MDI); polymethylene polyphenylene polyisocyanate and polymeric MDI, a mixture of polyisocyanates with MDI as the main component. The disclosure of EP-A-0,778,302 is herein incorporated by reference.

The polyisocyanate is used in such quantity that the isocyanate index is at least 150, preferably from 180 to 600, more preferably from 200 to 400 and most preferably from 200 to 320. As is well known in the art, the isocyanate index is defined as the 100 times the equivalence ratio of isocyanate groups to active hydrogen atoms, such as those present in the polyol component (a) and water.

The polyurethane catalyst, that may be employed as (part of) component (c) car be any urethane catalyst known to be suitable in urethane production. Suitable catalysts are those described in e.g. EP-A-0,358,282 and U.S. Pat. No. 5,011,908, the disclosure of these two patents are herein incorporated by reference, and include tertiary amines, salts of carboxylic acids and organometallic catalysts. Examples of suitable tertiary amines are triethylene diamine, N,N-dimethyl cyclohexyl amine, N-methyl morpholine, diethyl ethanol amine, diethanol amine, dimethyl benzyl amine and dimethyl cyclohexyl amine. Suitable organometallic catalysts include stannous octoate, stannous oleate, stannous acetate, stannous laureate, lead octoate, nickel naphthenate and dibutyltin dichloride. Further examples of organometallic catalysts are described in U.S. Pat. No. 2,846,408, and the disclosure thereof is herein incorporated by reference. Of course, mixtures of two or more of the aforementioned catalysts may also be used. Suitable polyisocyanurate catalysts or trimerisation catalysts are also well known in the art and include sodium acetate, potassium octoate or potassium acetate, e.g. dissolved in diethylene glycol, and strong basic materials, such as quaternary ammonium salts and tris (dimethylaminopropyl)triazine.

The amounts of polyisocyanurate catalyst and polyurethane catalyst will usually be in the range of from 1.0 to 8.0 parts by weight (pbw), more suitably 2.0 to 5.0 pbw, per 100 pbw of polyether polyol.

Suitable blowing agents are those conventionally applied in rigid polyurethane production and include water, partly halogenated alkanes, aliphatic alkanes and alicyclic alkanes. Fully halogenated hydrocarbons may also be used, but are less preferred due to their ozone depleting effect. Concrete examples of suitable blowing agents then include water, 1-chloro-1,1-difluoroethane, cyclopentane, cyclohexane, n-pentane, isopentane and mixtures of two or more of these. A combination of water on the one hand and n-pentane or cyclopentane on the other hand has beer found particularly useful. The amount of blowing agent used may range from 0.1 to 5 pbw per 100 pbw of polyol for water and 0.1 to 20 pbw per 100 pbw of polyol in case of partly halogenated hydrocarbons, aliphatic alkanes and alicyclic alkanes.

The auxiliaries, which form component (e), are the usual components and may include foam stabilisers, flame retardants, colouring agents and fillers. For instance, organosilicone surfactants are often used as foam stabilisers.

The present invention, finally, also relates to a rigid PIR/PUR foam obtainable by the process as described above, i.e. by foaming a formulation comprising the components (a) to (e) as defined herein before.

The PIR/PUR foam according to the invention typically has a free rise density of 10 to 100 kg/m$^3$, suitably 20 to 60 kg/m$^3$, and a compressive strength in the direction of the free rise of at least 140 kPa, preferably of 150 to 200 kPa, which is very good. Its flame retardant properties are also excellent: it meets the DIN4102 B2 small scale fire test.

The invention is further illustrated with the following examples without limiting the scope of the invention to these particular embodiments.

EXAMPLE 1

Preparation of Polyether Polyol

A solution of bisphenol A in polyethylene glycol was reacted with propylene oxide (molar ratio bisphenol A:polyethylene glycol:propylene oxide is 2.0:1.0:6.5) as follows.

Polyethylene glycol having a molecular weight of 600 was added to a reactor and the reactor was heated to 100° C. Then, bisphenol A was addend under continuous stirring and the temperature was raised to 120° C. After the bisphenol A had dissolved in the polyethylene glycol 0.15 wt % on final product of potassium hydroxide (KOH) was added as a solution in water to the solution. The water present in the KOH solution was removed by keeping the reactor at 120° C. and applying a vacuum of between 7 and 13 mbara until the water content had reduced to less than 0.5 wt % on total reaction mixture. Propylene oxide was then added at 110° C., in such manner that the pressure in the reactor remained below 5 bar $10^5$ N/m$^2$. The alkoxylation reaction was allowed to proceed until the pressure had reached a constant value of 1.5 bara. The KOH catalyst was removed by neutralising the reaction mixture with acetic acid.

The resulting co-initiated polyol product had an aromaticity of 20.1 wt %, an OH-value of 235 mg KOH/g, a propylene oxide content of 26 wt %, an ethylene oxide content of 42 wt % and an average molecular weight of 477.

EXAMPLE 2

Preparation of PIR/PUR Foam

The polyether polyol prepared in Example 1 was used in a foam formulation consisting of:

| | |
|---|---|
| 50 pbw | Rigid polyol A |
| 50 pbw | co-initiated polyether polyol of Example 1 |
| 20 pbw | Amgard dimethyl methyl phosphonate ex Albright & Wilson |
| 1.5 pbw | DABCO DC193, a silicone surfactant ex Air Products |
| 2.65 pbw | Jeffcat TR, a trimerisation catalyst ex Huntsman Chemicals |
| 1.52 pbw | water |
| 14.2 pbw | n-pentane |
| 227.3 pbw | CARADATE 30, a polymeric MDI ex Shell. |

(Amgard, DABCO, Jeffcat and CARADATE are trade marks).

Polyol A was a diethanol amine/aromatic propylene oxide-based polyol having a hydroxyl value of 530 mg KOH/g polyol and a nominal average functionality of 3.0 eq/mole.

The isocyanate index of this system was 200.

The foam was prepared by making a preblend of all components but the polyisocyanate. Subsequently, the polyisocyanate was poured into the preblend and the reaction mixture was stirred for 10 seconds and then poured into a polyethylene bag. Thus, a free-rise PIR/PUR, foam was formed.

The properties of the PIR/PUR foam are listed in Table I.

EXAMPLE 3

Preparation of PIR/PUR Foam

The polyether polyol prepared in Example 1 was used in a foam formulation consisting of:

| | |
|---|---|
| 100 pbw | co-initiated polyether polyol of Example 1 |
| 20 pbw | Amgard dimethyl methyl phosphonate |
| 3.0 pbw | DABCO K15, a trimerisation catalyst ex Air Products |
| 1.5 pbw | DABCO DC193 |
| 1.0 pbw | water |
| 16.0 pbw | n-pentane |
| 212.4 pbw | CARADATE 30. |

The isocyanate index of this system was 300.

A free-rise PIR/PUR foam was prepared in the same manner as in Example 2.

The properties of the PIR/PUR foam are listed in Table I.

TABLE I

Properties of PIR/PUR foams

| | Example 2 | Example 3 |
|---|---|---|
| Isocyanate index | 200 | 300 |
| Free rise density (kg/m$^3$) | 28.4 | 30.0 |
| Compressive strength (kpa) | 139 | 161 |
| Closed cell content (% v/v)* | 83.9 | 82.9 |
| Maximum flame height (cm)** | 15.0 | 11.0 |

*not corrected for cut surface.
**according to DIN4102 B2 small scale fire test: 15.0 cm or less means that the foam has passed the test.

What is claimed is:

1. A process for the preparation of a co-initiated polyether polyol, which process comprises the steps of:
   (a) preparing a mixture of:
      (a1) at least one aromatic initiator containing at least two active hydrogen atoms per molecule and
      (a2) at least one polyethylene glycol having a molecular weight in the range of from 400 to 1000 and
      (a3) optionally one or more aliphatic initiators containing from 2 to 6 active hydrogen atoms per molecule in an amount of at most 20 mole % based on total moles of (a1) and (a3),
      wherein the molar ratio of (a1) to (a2) is in the range of from 0.5:1 to 5:1,
   (b) reacting the mixture obtained in step (a) in the presence of a suitable alkoxylation catalyst with at least one alkylene oxide having three or more carbon atoms per molecule using such quantity of alkylene oxide that the polyether polyol obtained has a hydroxyl value in the range of from 150 to 400 mg KOH/g, and
   (c) recovering the co-initiated polyether polyol.

2. The process according to claim 1, wherein one aromatic initiator is mixed with one polyethylene glycol in step (a) in a molar ratio of aromatic initiator (a1) to polyethylene glycol (a2) of from 1:1 to 4:1.

3. The process according to claim 2, wherein the aromatic initiator is bisphenol A.

4. The process according to claim 1, wherein such quantity of alkylene oxide is used in step (b) that the polyether polyol obtained has a hydroxyl value in the range of from 200 to 300.

5. The process according to claim 1, wherein the sole alkylene oxide used in step (b) is propylene oxide.

6. A co-initiated polyether polyol having an aromaticity in the range of from 5 to 35 wt % and an average molecular weight in the range of from 300 to 1000, which polyether polyol is obtained by a process comprising the steps of:
   (a) preparing a mixture of:
      (a1) at least one aromatic initiator containing at least two active hydrogen atoms per molecule and
      (a2) at least one polyethylene glycol having a molecular weight in the range of from 400 to 1000 and
      (a3) optionally one or more aliphatic initiators containing from 2 to 6 active hydrogen atoms per molecule in an amount of at most 20 mole % based on total moles of (a1) and (a3), wherein the molar ratio of (a1) to (a2) is in the range or from 0.5:1 to 5:1,
   (b) reacting the mixture obtained in step (a) in the presence of a suitable alkoxylation catalyst with at least one alkylene oxide having three or more carbon atoms per molecule using such quantity of alkylene oxide that the polyesher polyol obtained has a hydroxyl value in the range of from 150 to 400 mg KOH/g, and
   (c) recovering the co-initiated polyether polyol.

7. The co-initiated polyether polyol according to claim 6 having an ethylene oxide content in the range of from 20 to 60 wt %.

8. The polyether polyol formulation comprising a co-initiated polyether polyol as claimed in claim 6 in admixture with a rigid, aromatic polyether polyol having a hydroxyl value of at least 400 mg KOH/g and an average nominal functionality of at least 3.

9. A process for the preparation of a rigid polyisocyanurate-containing polyurethane foam, which process comprises foaming a formulation comprising.
   (A) a co-initiated polyether polyol having an aromaticity in the range of from 5 to 35% and an average molecular weight in the range of from 300 to 1000, which polyether polyol is obtained by a process comprising the steps of: (a) preparing a mixture of:
      (a1) at least one aromatic initiator containing at least two active hydrogen atoms per molecule and
      (a2) at least one polyethylene glycol having a molecular weight in the range of from 400 to 1000 and
      (a3) optionally one or more aliphatic initiators containing from 2 to 6 active hydrogen atoms per molecule in an amount of at most 20 mole % based on total moles of (a1) and (a3) wherein the molar ratio of (a1) to (a2) is in the range of from 0.5:1 to 5:1,
      (b) reacting the mixture obtained in step (a) in the presence of a suitable alkoxylation catalyst with at least one alkylene oxide having three or more carbon atoms per molecule using such quantity of alkylene oxide that the polyether polyol obtained has a hydroxyl value in the range of from 50 to 400 mg KOH/g, and
      (c) recovering the co-initiated polyether polyol;
   (B) a polyisocyanate in such amount that the isocyanate index is at least 150,
   (C) a polyurethane catalyst and/or polyisocyanate catalyst,
   (D) one or more blowing agents, and
   (E) usual auxiliaries.

10. A rigid polyisocyanurate-containing polyurethane foam obtained by the process comprising a step of foaming a formulation comprising:

(A) a co-initiated polyether polyol having an aromaticity in the range of from 5 to 35 wt % and an average molecular weight in the range of from 300 to 1000, which polyether polyol is obtained by a process comprising the steps of:
 (a) preparing a mixture of:
  (a1) at least one aromatic initiator containing at least two active hydrogen atoms per molecule and
  (a2) at least one polyethylene glycol having a molecular weight in the range of from 400 to 1000 and
  (a3) optionally one or more aliphatic initiators containing from 2 to 6 active hydrogen atoms per molecule in an amount of at most 20 mole % based on total moles of (a1) and (a3), wherein the molar ratio of (a1) to (a2) is in the range of from 0.5:1 to 5:1),
 (b) reacting the mixture obtained in step (a) in the presence of a suitable alkoxylation catalyst with at least one alkylene oxide having three or more carbon atoms per molecule using such quantity of alkylene oxide that the polyether polyol obtained has a hydroxyl value in the range of from 150 to 400 mg KOH/g, and
 (c) recovering the co-initiated polyether polyol,
(B) a polyisocyanate in such amount that the isocyanate index is at least 150,
(C) a polyurethane catalyst and/or polyisocyanurate catalyst,
(D) one or more blowing agents, and
(E) usual auxiliaries.

* * * * *